ately connected with the rollers 4 and 7. The details of the motor, its winding mechanism, escapement, and other necessary parts, are not shown as they are of any approved construction.

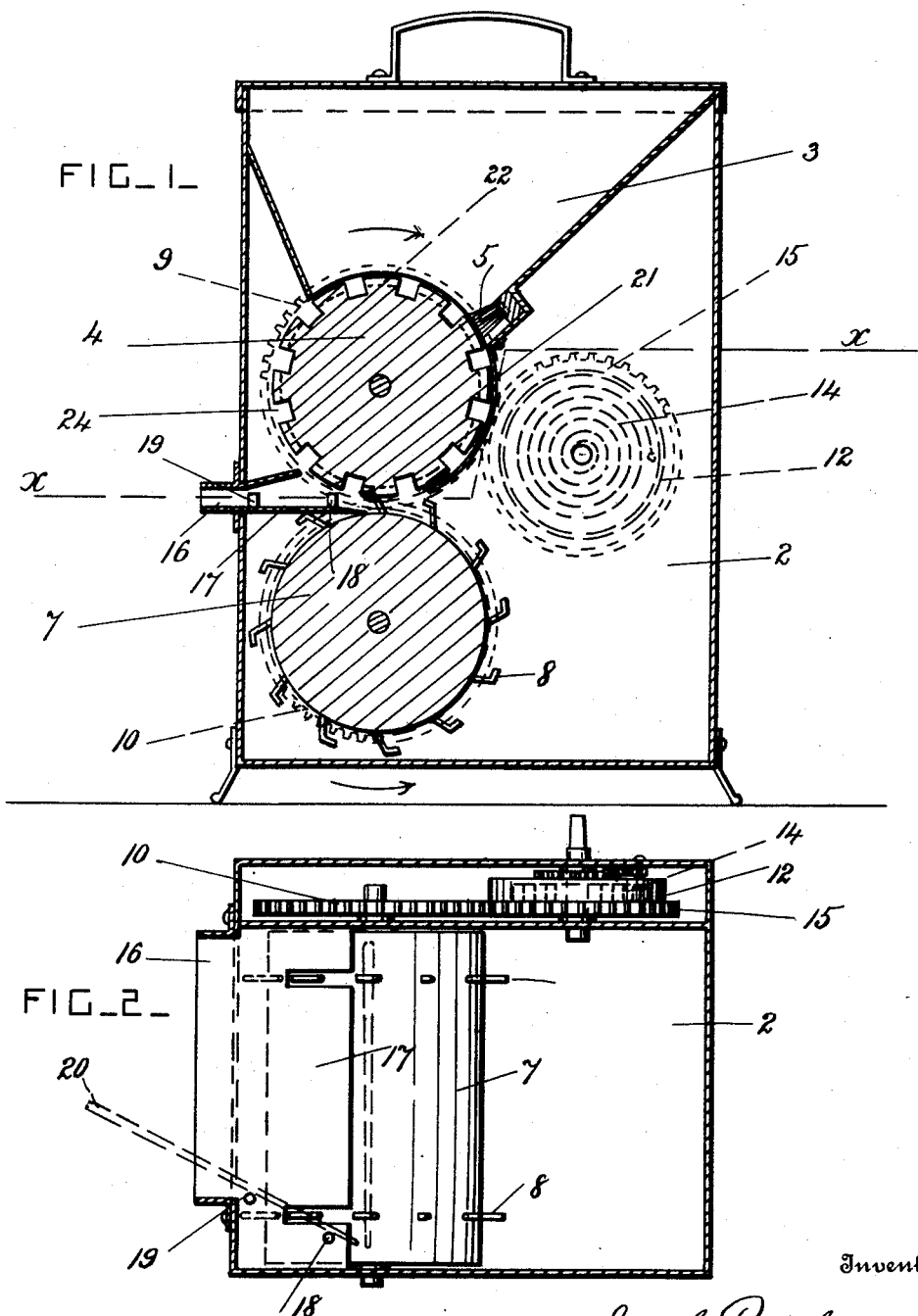

UNITED STATES PATENT OFFICE.

JACOB RATZLAFF, OF PORTLAND, OREGON.

SINGLE-DELIVERY RECEPTACLE.

1,061,926.  Specification of Letters Patent.  Patented May 13, 1913.

Application filed November 30, 1912. Serial No. 734,367.

*To all whom it may concern:*

Be it known that I, JACOB RATZLAFF, a citizen of the United States, residing at Portland, in the county of Multnomah and State of Oregon, have invented certain new and useful Improvements in Single-Delivery Receptacles; and I do hereby declare the following to be a full, clear, and exact description of the invention, such as will enable others skilled in the art to which it appertains to make and use the same.

This invention relates to receptacles which automatically deliver small articles, such as toothpicks, one by one as required for use; and it consists of a closed receptacle provided with a motor and delivery mechanism as hereinafter fully described and claimed.

In the drawings, Figure 1 is a vertical section through a receptacle constructed according to this invention. Fig. 2 is a sectional plan view taken on the line $x$—$x$ in Fig. 1.

The receptacle is provided with an inclosing case 2, in the upper part of which a hopper 3 is provided. The machine shown is adapted for delivering toothpicks one by one, and a supply of toothpicks is placed in the hopper. The machine can also be adapted to deliver matches or other small articles.

A feed roller 4 is journaled in the casing under the hopper, and is provided with a series of longitudinal grooves 24, spaced at equal distances apart around its periphery, and adapted to feed the toothpicks one by one from the hopper. A brush or wiper 5 is secured at the outlet point of the hopper to insure each groove having one toothpick only neatly arranged in it as it leaves the hopper. A delivery roller 7 is journaled in the casing below the feed roller, and is provided with projecting hooks 8 on its periphery. These hooks are arranged in pairs and at equal distances apart. Each toothpick is caught by a pair of hooks as it drops from the feed roller, and is carried over the top side of the delivery roller. Toothed wheels 9 and 10 are secured to the rollers 4 and 7, and gear into each other, so that the two rollers revolve in opposite directions, as indicated by the arrows in Fig. 1.

A motor 12 is provided inside the casing for revolving the rollers. This motor is preferably a spring motor or clock-work of any approved construction, and it is wound up with a key periodically, the same as a clock. The spring 14 of this motor drives a toothed wheel 15 which is operatively connected with the rollers 4 and 7. The details of the motor, its winding mechanism, escapement, and other necessary parts, are not shown as they are of any approved construction.

A slotted mouthpiece 16 is provided at the front side of the casing, and 17 is a receiving shelf or plate which is arranged under the mouthpiece level with the space between the two rollers. A stop 18 is provided on the plate 17, at the rear part of one end portion thereof, adjacent to one row of hooks, but a little out of line with them and nearer the side of the casing, so that the hooks will not strike it. The front part of the plate or the mouthpiece is also provided with a stop or guide 19. This guide may be any sort of a projection, flange, pin or pins, and it is arranged so that a toothpick 20 is always held diagonally of the rollers with one end of it projecting at the middle part of the slotted mouthpiece 16. The feed roller has circumferential grooves 22 to clear the tips of the hooks, and a curved plate 21 is provided to guide the toothpicks from one roller to the other. Each toothpick is carried over the top side of the delivery roller and is discharged onto the shelf or plate 17. One end portion of the toothpick strikes against the stop 18 so that the other end of it is swung around on the shelf until the toothpick rests against the guide and stops the motor, the rear end portion of the toothpick being caught between the stop and the hook as shown in Fig. 2. When the toothpick is removed by hand, the motor starts automatically, the jar of removing the toothpick being sufficient to insure the starting of the clockwork, and another toothpick is caused to project from the mouthpiece. In this manner the toothpicks are delivered one by one as often as required.

What I claim is:

1. In a delivery receptacle, the combination, with a casing provided with a mouthpiece and an internal receiving shelf, of a delivery roller journaled in the casing below the said shelf and provided with projections for delivering the articles one by one onto the shelf, a guide stop arranged inside the casing in the space between the projections and one side wall of the casing and adapted to swing each article around on the shelf so that its front end projects from the mouthpiece and its rear end locks the delivery roller, a motor for revolving the delivery roller when unlocked, and means for supplying the articles to the delivery roller.

2. In a delivery receptacle, the combination, with a casing provided with a mouthpiece and an internal receiving shelf, of a delivery roller journaled in the casing below the said shelf and provided with a series of projecting hooks arranged in pairs around its periphery and operating to deliver the articles one by one onto the shelf, a guide stop arranged inside the casing in the space between the hooks and one side wall of the casing and adapted to swing each article around on the shelf so that its front end projects from the mouthpiece and its rear end locks the delivery roller, a motor for revolving the delivery roller when unlocked, and means for supplying the articles to the delivery roller.

3. In a delivery receptacle, the combination, with a casing provided with a mouthpiece and an internal receiving shelf, of a hopper for the articles, a grooved feed roller journaled in the casing and adapted to feed the articles one by one from the hopper, a delivery roller journaled in the casing below the feed roller and the shelf and provided with projections for delivering the articles onto the shelf as they drop from the feed roller, a guide stop arranged inside the casing in the space between the projections and one side wall of the casing and adapted to swing each article around on the shelf so that its front end projects from the mouthpiece and its rear end locks the delivery roller, and a motor and driving mechanism for revolving the rollers simultaneously in opposite directions when the delivery roller is unlocked.

In testimony whereof I have affixed my signature in the presence of two witnesses.

JACOB RATZLAFF.

Witnesses:
  W. F. VANHORN,
  ED. KNOPF.